US010150859B2

(12) United States Patent
Beelen et al.

(10) Patent No.: US 10,150,859 B2
(45) Date of Patent: Dec. 11, 2018

(54) VULCANIZABLE RUBBER COMPOSITION (71) Applicant: ARLANXEO NETHERLANDS B.V., Geleen (NL)

(72) Inventors: Jacob Hubert Henri Beelen, Heerlen (NL); Martin Van Duin, Sittard (NL); Christoph Gogelein, Cologne (DE)

(73) Assignee: ARLANXEO NETHERLANDS B.V., Geleen (NL)

( * ) Notice: Subject to any disclaimer, the term of this patent is extended or adjusted under 35 U.S.C. 154(b) by 0 days.

(21) Appl. No.: 15/529,184

(22) PCT Filed: Dec. 4, 2015

(86) PCT No.: PCT/EP2015/078666
§ 371 (c)(1),
(2) Date: May 24, 2017

(87) PCT Pub. No.: WO2016/087647
PCT Pub. Date: Jun. 9, 2016

(65) Prior Publication Data
US 2017/0313868 A1 Nov. 2, 2017

(30) Foreign Application Priority Data

Dec. 5, 2014 (EP) .................... 14196564

(51) Int. Cl.
| C08L 23/16 | (2006.01) |
| C08K 5/00 | (2006.01) |
| C08K 5/01 | (2006.01) |
| C08K 3/34 | (2006.01) |
| C08L 7/00 | (2006.01) |
| C08L 9/00 | (2006.01) |
| C08L 9/06 | (2006.01) |

(52) U.S. Cl.
CPC ............... C08L 23/16 (2013.01); C08K 3/34 (2013.01); C08L 7/00 (2013.01); C08L 9/00 (2013.01); C08L 9/06 (2013.01); C08L 2205/06 (2013.01); C08L 2312/00 (2013.01)

(58) Field of Classification Search
CPC ... C08L 23/16; C08L 2205/06; C08L 2312/00
See application file for complete search history.

(56) References Cited

U.S. PATENT DOCUMENTS

| 3,773,732 A | 11/1973 | Dillenschneider |
| 4,136,244 A | 1/1979 | Massoubre |
| 4,136,245 A | 1/1979 | Massoubre |
| 4,189,555 A | 2/1980 | Massoubre |
| 4,202,954 A | 5/1980 | Massoubre |
| 5,416,143 A | 5/1995 | El Sayed et al. |
| 5,710,218 A * | 1/1998 | Nakahama ............ B60C 1/0016 524/302 |
| 6,251,977 B1 | 6/2001 | Georget et al. |
| 6,465,584 B1 | 10/2002 | Evens et al. |
| 6,693,145 B2 | 2/2004 | Graf et al. |
| 6,716,931 B2 | 4/2004 | Koshiba et al. |
| 9,868,845 B2 * | 1/2018 | Beelen .................... C08L 23/16 |
| 2016/0145411 A1 | 5/2016 | Uibel et al. |
| 2017/0313868 A1 * | 11/2017 | Beelen .................... C08L 23/16 |

FOREIGN PATENT DOCUMENTS

| EP | 0532764 A1 | 4/1992 | |
| EP | I0621309 A1 | 3/1994 | |
| EP | 0 657 501 A1 * | 6/1995 | ............. C08L 23/00 |
| EP | 0657501 A1 | 6/1995 | |
| EP | 0699712 A1 | 8/1995 | |
| JP | 56-104 906 A2 | 8/1981 | |
| JP | 2002146125 A2 | 5/2002 | |
| JP | 20010257194 | 5/2002 | |
| JP | 2007099942 A2 | 4/2007 | |
| JP | 20050292603 | 4/2007 | |

OTHER PUBLICATIONS

Gurp, M. "Time-Temperature Superposition for Polymeric Blends", 67, DMS Research, 1998, Geleen The Netherlands, pp. 5-8.

Trinkle, S. "Van Gurp-Palmen-Plot: A way to characterize ploydisprersity of linear polymers", Rheol. Acta, 40, pp. 322-328, Springer-Verlag, 2001.

Ullmann's Encyclopedia of Industrial Chemistry, vol. A 23, Rubber 3. Synthetic, VCH Verlagsgesellschaft mbH, D-69451 Weinheim, 1993, pp. 239-364.

Hsieh, H. L., "Anionic Polymerization, Principles and Practical Application", Chapter 17, Styrene-Diene Rubbers, Marcel Dekker Inc. New York, Basle 1996, pp. 447-469.

Houben-Weyl, Methoden der Organischen Chemie [Methods of Organic Chemistry], Thieme Verlag, Stuttgart, 1987, vol. E 20, pp. 114 to 134.

Franta, I. "Elastomers and Rubber Compounding Materials" Studies in Polymer Science, 1, Elsevier1989, pp. 65-75 and 92-94.

(Continued)

*Primary Examiner* — Robert Harlan (57) ABSTRACT

A vulcanizable rubber composition includes an oil extended copolymer composition, an unsaturated rubber, filler, process oil and a vulcanizing agent, wherein the oil extended copolymer composition ion has a phase angle $\delta_{min}$ of lower than 2.5, and includes: auxiliary agents, extender oil, and at least one ethylene-α-olefin-non-conjugated-diene copolymer having a weight average molecular weight (Mw) of at least 300,000 g/mol, an intrinsic viscosity higher than 4 measured in Xylene at 70° C., and a polydispersity (Mw/Mn) smaller than 3.

15 Claims, 1 Drawing Sheet

(56) References Cited

OTHER PUBLICATIONS

European Search Report from co-pending Application EP14196564 dated May 21, 2015, 2 pages.
International Search Report from co-pending Application PCT/EP2015/078666 dated Jan. 27, 2016, 3 pages.

* cited by examiner

VULCANIZABLE RUBBER COMPOSITION

The present invention relates to a vulcanizable rubber composition containing a certain oil extended ethylene-α-olefin-non-conjugated diene copolymer composition and an unsaturated rubber designated as R rubbers according to DIN/ISO 1629 and its vulcanized article, in particular an engine mount or other articles intended for used in dynamic applications such as flexible couplings and torsional vibration dampers but also belts, muffler hangers, air springs and bridge bearings.

Ethylene-α-olefin elastomers, particularly ethylene-propylene-diene terpolymers (EPDM) are recognized as excellent general-purpose elastomers that are useful in a wide variety of applications.

EPDM is consisting of ethylene and propylene repeating units with a smaller amount of diene units to introduce unsaturation and thus facilitate crosslinking of the polymer chains. Due to the substantial absence of unsaturation in the polymer backbone, EPDM rubbers exhibit superior oxidation, ozone and weather resistance, as well as better heat aging compared to conjugated diene rubbers. In addition, EPDM rubbers compare favorably in cost to many other elastomers and tolerate high concentrations of fillers and oil while maintaining good physical properties. For these reasons, ethylene-α-olefin elastomers, in particular EPDM, have been widely used either alone or blended with other elastomers in numerous applications including e.g. hoses, seals, gaskets, roofing materials and weather strips.

A known disadvantage of EPDM materials however, is their inferior performance in dynamic applications. Dynamic applications in this respect are those applications in which shaped parts are subjected to repeated stress forces and dynamic loading. Unfortunately, ethylene-alpha-olefin elastomers are known to exhibit only moderate dynamic fatigue resistance, wear resistance, tensile strength and modulus in such applications. Some of these properties even tend to be in opposition, making improved rubber compounds difficult to achieve. For example, increased crosslink density of cured rubber generally helps reduce compression set, but also results in reduced tear strength.

For EPDM polymers, peroxide curing is commonly used in place of sulfur curing to improve further the heat-aging properties, decrease compression set and improve adhesion to treated and untreated textiles. Unfortunately, the dynamic properties of peroxide cured rubbers are generally even worse than of sulfur-cured rubber. This fact further reduces the applicability of EPDM compounds in dynamic applications. This invention provides a solution also for peroxide cured goods.

As a consequence, use of EPDM in dynamic applications, such as power transmission belting, flat belting, flexible couplings, torsional vibration dampers, air springs, engine mounts and the like, has therefore been rather limited, especially for peroxide-cured compounds for instance in WO96/13544.

These types of parts are instead most commonly manufactured using elastomers with superior dynamic mechanical properties such as natural rubber, styrene-butadiene rubber, polychloroprene and blends thereof. In particular, natural rubber performs much better in dynamic applications due to its strain-induced crystallization, but it is lacking in heat and ozone resistance.

While these polymers provide acceptable performance and exhibit good processability, it would be highly desirable to develop an EPDM rubber that exhibits sufficient dynamic mechanical endurance to allow for its use in the above-mentioned dynamic applications.

To meet this target, EPDM has been blended with other elastomers exhibiting more favorable mechanical properties in order to develop a rubber having improved dynamic properties. These elastomers include polychloroprene, diene rubbers and organo-polysiloxane resins. In such cases, EPDM is added to improve the heat-, ozone- or oxygen resistance while maintaining or reducing the cost of the final composition.

The effectiveness of these compounds is restricted by the fact that the proportion of EPDM that may be utilized is fairly limited in order to produce a compound with acceptable mechanical properties. In addition, the processing of such compounds is often troublesome and expensive.

Furthermore, the conditions necessary for acceptable curing of EPDM and other elastomers that may be used often conflict. The poor mixability and cure incompatibility of EPDM and highly unsaturated diene rubbers is demonstrated by the poor performance of the resulting composition in stress-strain tests. In fact, such compositions generally perform worse than either pure polymer. This poor performance is due in part to several factors. One cause is the difference in vulcanization rates. Optimal vulcanization for one of the rubbers will often lead to poor vulcanization of the other. This, combined with the preference of various accelerators for one polymer over the other, makes it difficult to achieve satisfactory vulcanization for both polymers. A second factor that contributes to poor vulcanization is the difficulty in achieving uniform dispersion between the two rubbers. Significantly, different solubility parameters produce poor compatibility between rubbers, resulting in difficulty when attempting to mix such rubbers to a uniform dispersion. This produces an inhomogeneous product with irregular and non-uniform properties. Traditional compatibilizers such as terpene resins and surface activated low molecular weight polymers have not been effective in mitigating this incompatibility.

In another approach, various additives have been tested in EPDM compounds to increase their tensile strength and fatigue resistance. Increasing the amount of reinforcing filler and peroxide has been shown to increase both hardness and modulus of the final rubber. However, the increase of filler has also been shown to correspondingly decrease the dynamic flex fatigue resistance of the resulting product. Furthermore, high levels of peroxide may decrease the tear strength of the final product. Zinc salts of (meth-)acrylic acids have also been added to EPDM in attempts to increase the wear resistance, tensile strength, modulus and lifetime of the elastomer under dynamic loading conditions, see e.g. WO96/13544 and EP964030. This approach is limited to peroxide cure and may negatively influence the compression sets. A further drawback is the limited compatibility of such zinc salts with the uncured EPDM which makes mixing very difficult.

A general problem for all of these methods is that they require additional expense and/or the compounds are at least relatively difficult to process.

Therefore, a need remains for an EPDM rubber suitable for dynamic applications that exhibits superior tensile and tear strength while maintaining weather, heat, oxygen and ozone resistance as well as ease of processing and moderate cost.

In WO03/020806 various EPDMs are used for the production of rubbers for dynamic applications, wherein the rubbers used are oil extended medium molecular weight elastomers. However, the polymers disclosed still show room for improvement with respect to the dynamic properties of their vulcanizates.

In U.S. Pat. No. 6,716,931 oil extended EPDM having quite a broad polydispersity of 3 to 5 is mentioned for dynamic applications. Vulcanizates made from such polymers with broad molecular weight distribution have the drawback that they have a high number of free dangling chain ends deteriorating the dynamic properties.

In EP621309 oil extended EPDM having an intrinsic viscosity of the EPDM of 2.8 to 3.7 (in Xylene at 70° C.) and an oil content of 30 to 50 phr. Due to the non-use of a reactivator in the catalyst system the rubbers described in this patent also have the drawback that they are inhomogeneous and have relatively high branching as mentioned e.g. in EP994906.

In EP 13173470.9 (application No.) a certain oil modified EPDM composition has been disclosed for dynamic applications.

To date, an ethylene-alpha-olefin elastomeric composition which is readily processable, and with adequate and heat stable mechanical properties in dynamic applications, and which is highly resilient with excellent vibration isolation properties, to enable its use as the primary base elastomeric composition in applications such as mounts, in particular engine mounts, belting including power transmission and flat belting, air springs and the like has not been known.

Accordingly, it is an object of the present invention to provide an oil extended EPDM rubber for use as the primary elastomeric composition in articles subject to dynamic loading with good dampening, good aging, excellent dynamic properties, low tan δ and adequate mechanical properties.

This objective is achieved with a vulcanizable rubber composition comprising a) an oil extended copolymer composition consisting of
  i) 100 parts of at least one ethylene-α-olefin-non-conjugated-diene copolymer having
    a weight average molecular weight (Mw) of at least 300,000 g/mol.
    an intrinsic viscosity higher than 4, preferably higher than 4.2 measured in Xylene at 70° C. and
    a polydispersity (Mw/Mn) smaller than 3, preferably smaller than 2.8, in particular smaller than 2.6;
  ii) 30 to 70 parts by weight per 100 parts by weight of the ethylene-α-olefin-non-conjugated-diene copolymer (i) of an extender oil and
  iii) up to 5 parts by weight per 100 parts by weight of the ethylene-α-olefin-non-conjugated-diene copolymer (i) of auxiliary agents,
  whereby the oil extended copolymer composition has a phase angle $δ_{min}$ of lower than 2.5,
b) 1 to 15 parts, preferably 2 to 10 by weight per 100 parts by weight based on the ethylene-α-olefin-non-conjugated-diene (i) of the oil extended copolymer composition a) of an unsaturated rubber designated as R rubbers according to DIN/ISO 1629,
c) 30 to 100 parts by weight per 100 parts by weight based on the ethylene-α-olefin-non-conjugated-diene (i) of the oil extended copolymer composition a) of a filler,
d) 0 to 30 parts by weight per 100 parts by weight based on the ethylene-α-olefin-non-conjugated-diene copolymer (i) of the composition a) of a process oil, provided that the total amount of extender oil from the composition a) and process oil does not exceed 80 parts by weight per 100 parts by weight based on the ethylene-α-olefin-non-conjugated-diene copolymer (i) of the composition a) and
e) a vulcanizing agent.

Component a)
Ethylene-α-Olefin-Non-Conjugated-Diene Copolymer (i)

The preferred ethylene content, more precise spoken ethylene unit content, of the ethylene-α-olefin-non-conjugated-diene copolymer is 48 to 65% by weight of the polymer. Here, the "unit" means a polymerized monomer unit. For example, the "ethylene unit" means a polymerized ethylene unit.

Examples of the α-olefin of the ethylene-α-olefin-non-conjugated diene copolymer contained in the oil-extended copolymer of component a) are propylene, 1-butene, 1-pentene, 1-hexene, 4-methyl-1-pentene, 1-octene and 1-decene. Of these, propylene and 1-butene are preferred. Propylene is the most preferred.

In particular the α-olefin content is the balance to ethylene and the diene. Preferably the $C_2$/α-olefin ratio is from 73/27 to 40/60.

Preferably the "non-conjugated diene" of said copolymer means not only a non-conjugated diene but also a non-conjugated polyene such as a non-conjugated triene. Examples of such compounds are linear non-conjugated dienes such as 1,4-hexadiene, 1,6-octadiene, 2-methyl-1,5-hexadiene, 6-methyl-1,5-heptadiene and 7-methyl-1,6-octadiene; cyclic non-conjugated dienes such as cyclohexadiene, dicyclopentadiene, methyltetraindene, 5-vinylnorbornene, 5-ethylidene-2-norbornene and 6-chloromethyl-5-isopropenyl-2-norbornene; trienes such as 2,3-diisopropylidene-5-norbornene, 2-ethylidene-3-isopropylidene-5-norbornene, 2-propenyl-2,2-norborna-diene, 1,3,7-octatriene and 1,4,9-decatriene; 5-vinyl-2-norbornene; 5-(2-propenyl)-2-norbornene; 5-(3-butenyl)-2-norbornene; 5-(4-pentenyl)-2-norbornene; 5-(5-hexenyl)-2-norbornene; 5-(5-heptenyl)-2-norbornene; 5-(7-octenyl)-2-norbornene; 5-methylene-2-norbornene; 6,10-dimethyl-1,5,9-undecatriene; 5,9-dimethyl-1,4,8-decatriene; 4-ethylidene-8-methyl-1,7-nonadiene; 13-ethyl-9-methyl-1,9,12-pentadecatriene; 5,9,13-trimethyl-1,4,8,12-tetradecadiene; 8,14,16-trimethyl-1,7,14-hexadecatriene and 4-ethylidene-12-methyl-1,11-pentadecadiene. These compounds may be used singly or in combination of two or more. A preferred compound is 5-ethylidene-2-norbornene or dicyclopentadiene or a combination of both.

Preferably the diene content is 3 to 7% by weight of the ethylene-α-olefin-non-conjugated-diene copolymer.

The ethylene-α-olefin-non-conjugated-diene copolymer (i) preferably does have a weight average molecular weight (Mw) measured by high temperature GPC of at least 300,000 g/mol, preferred at least 400,000 g/mol, in particular from 400,000 to 700,000 g/mol. The intrinsic viscosity, measured in Xylene at 70° C., will preferably at least be 4.2

The polydispersity, namely, weight average molecular weight/number average molecular weight, measured by high temperature gel permeation chromatography of the ethylene-α-olefin-non-conjugated diene copolymer contained in the oil-extended composition is in the range of 2 to 2.8, preferably 2 to 2.5.

Extender Oil (ii)

The "extender oil" used in component a) preferably means a petroleum softening agent conventionally used in the production of oil-extended rubber. Examples of the extender oil are paraffinic, naphthenic and aromatic extender oils obtained by purifying, and if necessary further processing, of high boiling fractions of petroleum. These extender oils generally show a dynamic viscosity of from 5 to 35 mm² /s at 100° C. Preferred processing oils are paraffinic ones. A suitable paraffinic oil is e.g. Sunpar® 2280, available from Sunoco or clear paraffinic oil like Conopure® 12P, available from ConocoPhillips. Oils made via a gas to liquid (GTL) process, like e.g. Risella® X 430 from Shell, are also preferred.

Auxiliary Agents (iii)

Auxiliary agents are further ingredients of the oil extended ethylene-α-olefin-non-conjugated-diene copolymer like antioxidants (such as Irganox® 1076 from BASF), UV stabilizers, partitioning agents or processing aids (like talc or metal salts such as e.g. zinc, magnesium or calcium stearate) that will remain in the rubber after manufacturing. Their content in sum is preferably even quite low, in particular from 0 to 2, most preferably from 0 to 1 parts by weight per 100 parts by weight of the ethylene-α-olefin-non-conjugated-diene copolymer (i).

Phase Angle $\delta_{min}$

The phase angle $\delta_{min}$ is known by the man skilled in the art for instance in S. Trinkle, and C. Friedrich, Rheol. Acta, 40:322-328, 2001 and M. van Gurp, and J. Palmen, J. Rheol. Bull., 67:5-8, 1998. The $\delta_{min}$ value is a complex quantity which comprises several polymer properties such as the molecular weight, the monomer distribution, the polydispersity, the long-chain branching and the extender oil concentration. By combing these properties in a single parameter, $\delta_{min}$ is used to characterize the intrinsic dynamic properties of EPDM-based vibration isolation devices. The phase angle $\delta_{min}$ can be determined by conventional methods known to the man skilled in the art for instance mentioned in the above mentioned articles. In particular the measurement is as follows: Frequency sweeps are done in the range $10^{-2}$ to $10^3$ Hz (logarithmic scaling with 8 data points per decade of frequency) at −60, −50, −40, −30, −20, −10, 0, 10, 20, 40, 60, 80, 100, and 120 degree Celsius, respectively. To ensure that the applied stresses and deformations are within the limits of linear viscosity, a constant force of 0.5N is applied if the deformation of the sample is equal or less than 0.5 μm. Otherwise a constant deformation of 0.5 μm is used. The oscillatory measurements reveal the magnitude of the shear modulus, G*, and the loss factor, tan(δ). By plotting the phase angle, δ, versus |G*|, the van Gurp-Palmen plot is obtained. The minimum of δ(|G*|) reveals $\delta_{min}$. The phase angle $\delta_{min}$ preferably is lower than 2.3.

The oil extended ethylene-α-olefin-non-conjugated-diene copolymer composition of the component a) preferably has a Mooney viscosity ML(1+8)150° C. of 50 and 90 MU, in particular of 60 to 80 MU.

Process

A process for producing the ethylene-α-olefin-non-conjugated-diene copolymer (i) contained in the oil-extended copolymer of the component a) is not particularly limited. It can be produced by a slurry, solution or gas phase polymerization process using e.g. a conventional vanadium based catalyst or metallocene or post-metallocene catalysts. Suitable processes and catalysts are known in the literature.

The oil-extended EPDM composition of the component a) can be produced by a process wherein the extender oil is blended with the ethylene-α-olefin-non-conjugated-diene copolymer (i) during the production step thereof. The addition preferably takes place after the reactor but before the removal of volatiles, for instance before a steam stripper. More specifically, it is produced by a process wherein the extender oil is blended with the ethylene-α-olefin-non-conjugated-diene copolymer (i) which is dissolved or suspended in the reaction media coming from the polymerization reactor. The reason therefore is that in case of adding the oil later, it may result in failure to sufficiently blend the copolymer with the extender oil because of the high molecular weight of the ethylene-α-olefin-non-conjugated-diene copolymer (i) used in the present invention.

Component b)

The diene rubber components b) of the invention preferably include those based on dienes, particular examples being rubbers which contain double bonds in the main chain and which comprise practically no gel content, and which DIN/ISO 1629 terms R-rubbers. Examples of rubber components preferably used are those based on natural rubber (NR), polyisoprene (IR), styrene/butadiene rubber (SBR), polybutadiene rubber (BR), styrene/isoprene rubber (SIBR), nitrile rubber (NBR), butyl rubber isobutene/isoprene rubber (IIR), hydrogenated nitrile rubber (HNBR), styrene/butadiene/acrylonitrile rubber (SNBR), polychloroprene (CR), carboxylated styrene/butadiene rubber (XSBR), carboxylated butadiene/acrylonitrile rubber (XNBR), epoxydized natural rubber (ENR), epoxydized styrene/butadiene rubber (ESBR) and mixtures of these. Preferred rubber components of component b) in the invention are at least one selected from the group selected from NR, IR, SBR, and BR.

Particular preference is given to natural rubber (NR), to synthetic polyisoprene (IR) and to polybutadiene rubber (BR) and also to styrene/diolefin rubbers, in particular styrene/diene rubbers, in particular styrene/butadiene rubbers, and also to mixtures of these rubbers.

Natural Rubber (NR) is collected as latex from the *Hevea Brasiliensis* and its subspecies. More recently, also Guayule and Russian dandelion have been cultivated for NR production.

Producers for NR are preferably found in South-east Asia, such as Malaysia, Indonesia, Thailand, Vietnam, India, China, and numerous other Asiatic, African and American countries.

Raw NR, as coagulated from the latex, may contain in addition to the hydrocarbon component, impurities. The amount of impurities depend on the origin and the coagulation process conditions, and can add up to 15%, typically between 2-10%.

The rubber hydrocarbon component of NR preferably consists of over 99% of (linear) cis-1,4-polyisoprene. The average molecular weight of the polyisoprene in NR preferably ranges from 100.000-600.000, more specifically from 200.000-400.000.

Preferably, NR grades belonging to the group of Technically Specified Rubbers are utilized. Examples are SMR and SVR type of rubbers. These are graded for dirt, ash and nitrogen content in addition to volatile matter and the so called plasticity retention index (PRI). Suitable PRI values determined according to ISO 2930:1995 are in between 20 to 80.

More preferably, the viscosity stabilized grades are used with a Mooney range, measured at 100° C., in the range between 20-100 MU, such as SMR CV 60 or SVR CV 60.

Synthetic polyisoprene (IR) preferably has at least 70% 1,4-cis content. IR is normally synthesized either by means of lithium catalysts or else with the aid of Ziegler/Natta catalysts (Houben-Weyl, Methoden der Organischen Chemie [Methods of organic chemistry], Thieme Verlag, Stuttgart, 1987, volume E 20, pages 114 to 134; Ullmann's Encyclopedia of Industrial Chemistry, Vol. A 23, Rubber 3. Synthetic, VCH Verlagsgesellschaft mbH, D-69451 Weinheim, 1993, pp. 239-364). IR also includes, polyisoprene known as 3,4-polyisoprene, having glass transition temperatures in the range of −20° C. to +30° C.

Molecular weights of IR are typically high, in the range of 1.000.000-2.000.000. More preferably, Mooney at 100° C. ranges from 50-150 MU.

Styrene/diolefin rubbers (in particular butadiene rubbers) mean not only solution SBR rubbers, abbreviated to SSBR, but also emulsion SBR rubbers, abbreviated to: ESBR. SSBR means rubbery polymers which are produced in a solution process, based on vinylaromatics and on conjugated dienes (H. L. Hsieh, R. P. Quirk, Marcel Dekker Inc. New York, Basle 1996; I. Franta Elastomers and Rubber Compounding Materials; Elsevier 1989, pages 73-74, 92-94; Houben-Weyl, Methoden der Organischen Chemie [Methods of organic chemistry], Thieme Verlag, Stuttgart, 1987, volume E 20, pages 114 to 134; Ullmann's Encyclopedia of Industrial Chemistry, Vol A 23, Rubber 3. Synthetic, VCH Verlagsgesellschaft mbH, D-69451 Weinheim, 1993, S. 239-364, and also (FR 2 295 972)). Suitable vinylaromatic monomers are styrene, o-, m-, and p-methylstyrene, industrial methylstyrene mixtures, p-tert-butylstyrene, α-methylstyrene, p-methoxystyrene, vinylnaphthalene, divinylbenzene, trivinylbenzene, and divinylnaphthalene. Styrene is preferred. The content of copolymerized vinylaromatic is preferably from 5 to 50% by weight, more preferably from 10 to 40% by weight. Suitable diolefins are 1,3-butadiene, isoprene, 1,3-pentadiene, 2,3-dimethylbutadiene, 1-phenyl-1,3-butadiene, and 1,3-hexadiene. Preference is given to 1,3-butadiene and isoprene. The content of copolymerized dienes is from 50 to 95% by weight, preferably from 60 to 90% by weight.

The content of vinyl groups in the copolymerized diene is from 10 to 90%, and the content of 1,4-trans double bonds is from 20 to 80%, and the content of 1,4-cis double bonds is complementary to the entirety of vinyl groups and 1,4-trans double bonds. The vinyl content of the SSBR is preferably >20%.

The polymerized monomers and the various diene configurations usually have random distribution in the polymer. The definition of SSBR (A) is also intended to include rubbers having block-type structure, these being termed integral rubber (K.-H. Nordsiek, K.-H. Kiepert, GAK Kautschuk Gummi Kunststoffe 33 (1980), no. 4, 251-255).

SSBR is intended to mean not only linear rubbers but also branched or end-group-modified rubbers. By way of example, FR 2 053 786 and JP-A-56-104 906 are mentioned here. The branching agent used preferably comprises silicon tetrachloride or tin tetrachloride.

SSBR is in particular produced by anionic solution polymerization, i.e. by means of catalyst based on alkali metal or on alkaline earth metal, in an organic solvent.

The vinylaromatic/diolefin rubbers polymerized in solution advantageously have Mooney values of from 20 to 150 Mooney units, preferably from 30 to 100 Mooney units.

ESBR means rubbery polymers which are produced in an emulsion process based on vinylaromatics, on conjugated dienes and, if appropriate, on further monomers (Ullmann's Encyclopedia of Industrial Chemistry, Vol A 23, Rubber 3. Synthetic, VCH Verlagsgesellschaft mbH, D-69451 Weinheim, 1993, pp. 247-251). Vinylaromatics are styrene, p-methylstyrene, and alpha-methylstyrene. Dienes are in particular butadiene and isoprene. Further monomers are in particular acrylonitrile. The contents of vinylaromatics are from 10 to 60% by weight. The glass transition temperature is from −50 to +20° C. (determined by means of DSC), and the Mooney values are from 20 to 150 Mooney units. In particular, the high-molecular-weight ESBR grades with Mooney values >80 MU can comprise amounts of from 30 to 100 parts by weight of oils, based on 100 parts by weight of rubber. The oil-free SSBR rubbers have glass transition temperatures of from −80° to +20° C., determined by differential thermal analysis (DSC).

Polybutadiene (BR) encompasses in particular two different classes of polybutadiene. The first class has 1,4-cis content of at least 90%, and is produced with the aid of Ziegler/Natta catalysts, based on transition metals. It is preferable to use catalyst systems based on Ti, Ni, Co, and Nd (Houben-Weyl, Methoden der Organischen Chemie [Methods of organic chemistry], Thieme Verlag, Stuttgart, 1987, volume E 20, pages 114 to 134; Ullmann's Encyclopedia of Industrial Chemistry, Vol A 23, Rubber 3. Synthetic, VCH Verlagsgesellschaft mbH, D-69451 Weinheim, 1993, pp. 239-364). The glass transition temperature of this polybutadiene is preferably <−90° C. (determined by means of DSC).

The second class of polybutadiene is produced using Li catalysts, and has vinyl contents of from 10% to 80%. The glass transition temperatures of these polybutadiene rubbers are in the range from −90 to +20° C. (determined by means of DSC).

The average molecular grade of suitable BR grades is in the range of 100.000-500.000 with corresponding Mooney ranges at 100° C. in between 20-100, more specifically between 30-75.

Component c) Filler

Preferably the filler is used in an amount of 50 to 80 parts by weight per 100 parts by weight based on the ethylene-α-olefin-non-conjugated-diene (i) of component a). Preferred fillers are carbon black or inorganic fillers such as silica, calcium carbonate, talc and clay, which are conventionally used for rubber. The type of carbon black is classified according ASTM D-1765 for its particle size (BET in $m^2/g$) and structure (DBP adsorption in $cm^3/100$ g). Preferably carbon black fillers are used with a BET number in from 5 to 150, and DBP numbers in from 30 to 140. In the industry these type of carbon blacks are often designated to by abbreviations, such as MT, SRF, GPF, FEF, HAF, ISAF, SAF. The inorganic fillers may be surface treated with e.g. suitable silanes. Combinations of two or more of such fillers may be used. Most preferably used are carbon black and/or silanized silica.

Component d) Process Oil

As process oil the same as the extender oil can be used. Furthermore as process oil lubricating oil, paraffin, liquid paraffin, petroleum asphalt, vaseline, low molecular weight polyisobutylene or polybutylene, liquid EPDM or EPM, coal tar pitch, caster oil, linseed oil, beeswax, atactic polypropylene and cumarone indene resin can be mentioned. However, as the extender oil of the oil extended EPDM composition may be sufficient for the purpose of the present invention no further oil need to be added to form the vulcanizable rubber composition. If so the total oil content shall be limited to the 80 parts by weight per 100 parts by weight based on the ethylene-α-olefin-non-conjugated-diene copolymer (i) of the EPDM composition a). Preferred is the addition of 5 to 15 parts by weight of paraffinic extender oil per 100 parts by weight based on the ethylene-α-olefin-non-conjugated-diene copolymer (i). This paraffinic oil may be made according to a GTL process.

Component e) Vulcanizing Agent

Examples of the vulcanizing agent are sulfur; sulfur chloride; sulfur dichloride; 4,4'-dithiodimorpholine; morpholine disulfide; alkylphenol disulfide; tetramethylthiuram disulfide; selenium dimethyldithiocarbamate; and organic peroxides such as dicumyl peroxide, 2,5-dimethyl-2,5-di(t-butylperoxy)hexane, 2,5-dimethyl-2,5-d i(benzoylperoxy)-hexane, 2,5-dimethyl-2,5-(t-butylperoxy)hexyne-3, di-t-butylperoxide, di-t-butylperoxide-3,3,5-trimethylcyclohexane and t-butylhydroperoxide. Of these, preferred are sulfur, dicumyl peroxide, di-t-butylperoxide and t-butylperoxide-3,3,5-trimethylcyclohexane.

In case of sulfur cure, sulfur is preferably used in an amount of 0.1 to 10 parts by weight, and preferably from 0.5 to 5 parts by weight, per 100 parts by weight of the ethylene-α-olefin-non-conjugated-diene (i).

In case of peroxide cure, the organic peroxide is used in an amount of usually from 0.1 to 15 parts by weight, and preferably from 0.5 to 8 parts by weight, per 100 parts by weight of said copolymer.

The vulcanizing agent may be used, if necessary, in combination with a vulcanization accelerator and a vulcanization coagent. Examples of the vulcanization accelerator are N-cyclohexyl-2-benzothiazole-sulfenamide, N-oxydiethylene-2-benzothiazole-sulfen-amide, N,N-diisopropyl-2-benzothiazole-sulfenamide, 2-mercaptobenzothiazole, 2-(2,4-dinitrophenyl)mercaptobenzothiazole, 2-(2,6-diethyl-4-morpholinothio)benzothiazole, dibenzothiazyl-disulfide, diphenylguanidine, triphenylguanidine, di-o-tolylguanidine, o-tolyl-bi-guanide, diphenylguanidine-phthalate, an acetaldehyde-aniline reaction product, a butylaldehyde-aniline condensate, hexamethylenetetramine, acetaldehyde ammonia, 2-mercaptoimidazoline, thiocarbaniride, diethylthiourea, dibutylthiourea, trimethylthiourea, di-o-tolylthiourea, tetramethylthiuram monosulfide, teramethylthiuram disulfide, teraethylthiuram disulfide, terabutylthiuram disulfide, dipenta-methyl-enethiuram tetrasulfide, zinc dimethyldithiocarbamate, zinc diethyl-thiocarbamate, zinc di-n-butylthiocarbamate, zinc ethylphenyldithiocarbamate, zinc butylphenyl-dithiocarbamate, sodium dimethyldithlocarbamate, selenium dimethyl-dithiocarbamate, tellurium diethyldithiocarbamate, zinc dibutylxanthate and ethylenethiourea. The vulcanization accelerator if used is used preferably in an amount of from 0.1 to 20 parts by weight, and in particular from 0.2 to 10 parts by weight, per 100 parts by weight of the ethylene-α-olefin-non-conjugated-diene (i).

Examples of the vulcanization coagent are metal oxides such as magnesium oxide and zinc oxide. Of these, preferred is zinc oxide. The vulcanization coagent is used usually in an amount of from 2 to 20 parts by weight per 100 parts by weight of the ethylene-α-olefin-non-conjugated-diene (i) of component a).

When peroxides are used as the vulcanizing agent, examples of cross-linking coagent or activator are cyanurate compounds, such as triallyl cyanurate (TAC) and triallylisocyanurate (TAIC), (meth)acrylate compounds, such as trimethylolpropane-trimethacrylate (TMPT or TRIM) and ethyleneglycloldimethacrylate (EDMA), zinc-dimethacrylate (ZDMA) and zincdiacrylate (ZDA), divinylbenzene, p-quinonedioxime, m-phenylene dimaleimide (HVA-2), (high vinyl) polybutadiene, and combinations thereof. When peroxides are used as the vulcanizing agent in addition, preferably sulphur (elementary or as part of sulphur accelerators or donors) can be used to obtain so called hybrid curing systems. These curing systems combine high heat resistant properties, typical for peroxide cure, with very good ultimate properties, such as tensile and tear, as well as excellent dynamic and fatigue properties typically associated with sulphur curing systems. Applied dosing levels of sulphur are preferably from 0.05 to 1.0 parts by weight, preferably from 0.2 to 0.5 parts by weight per 100 parts by weight based on the ethylene-α-olefin-non-conjugated-diene copolymer (i).

The vulcanizable rubber composition might in addition also contain other ingredients, such as antioxidants (e.g. TMQ), dessicants (e.g. CaO), tackyfiers (e.g., resin), bonding agents, pigments, process aids (e.g. factice, fatty acids, stearates, poly- or di-ethylene glycol). The present invention also relates to a vulcanized rubber article made from the vulcanizable rubber composition of the present invention. Such a vulcanized rubber article is preferably an engine mount.

The present invention also relates to a process for forming a vulcanized rubber article comprising the steps processing a rubber composition according to the present invention to form the final shape of the molded article and curing said rubber composition.

Such a process preferably comprises, for example, the steps of (i) kneading a the oil-extended EPDM composition a), the diene rubber of the component b), a vulcanizing agent, a filler and, if necessary, the above-mentioned other ingredients, with a conventional kneading machine such as an open roll mill, an internal mixer, a kneader and an extruder to obtain a mixed product, and (ii) vulcanizing (cross-linking) the resulting kneaded product under heating. Such a mixing process can be done in one or more steps as known to a man skilled in the art.

The vulcanized rubber articles in accordance with the present invention can be used the most suitably for rubber vibration insulator such as an engine mount and a muffler hanger or other articles intended for used in dynamic applications such as flexible couplings and torsional vibration dampers but also belts, air springs and bridge bearings.

EXAMPLES

Measurements
Phase Angle δ

Figure 1:
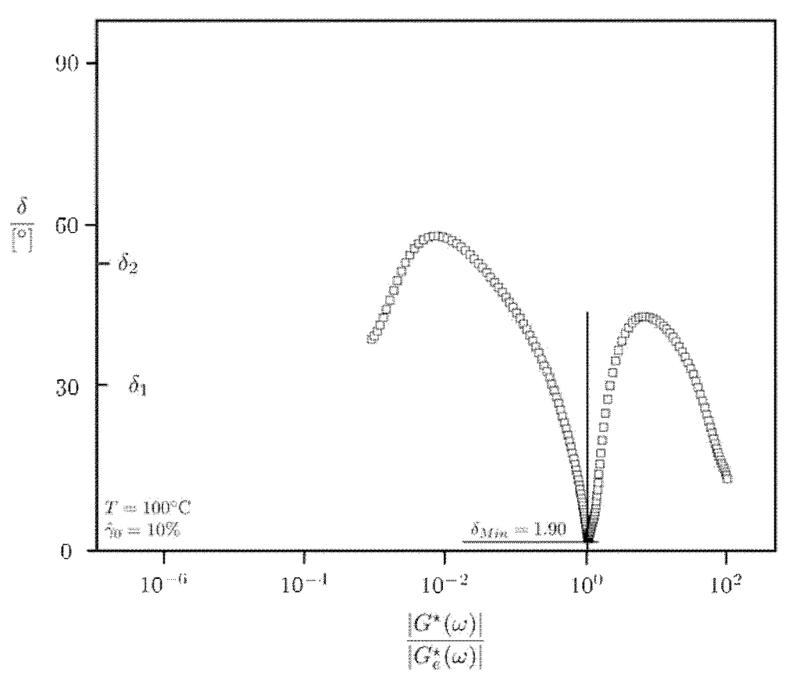

The rheological measurements are accomplished using a DMA/STDA 861e instrument from Mettler-Toledo. The EPDM samples have a thickness of 1 millimeter and a diameter of 6 millimeter. Two samples are mounted symmetrically in a double shear sandwich sample holder. The temperature of the furnace is controlled to an accuracy of 0.5 degree Kelvin using liquid nitrogen and electric heaters. To characterize the polymer dynamic properties, frequency sweeps are done in the range from $10^{-2}$ to $10^3$ Hz (logarithmic scaling with 8 data points per decade of frequency) at −60, −50, −40, −30, −20, −10, 0, 10, 20, 40, 60, 80, 100, and 120 degree Celsius, respectively. The applied stresses and deformations are within the limits of linear viscosity. If the deformation of the sample is equal or smaller than 0.5 μm a constant force of 0.5N is applied. Otherwise a constant deformation of 0.5 μm is used. The oscillatory measurements reveal the magnitude of the shear modulus, $G^*$, and the loss factor, tan(δ). Plotting the phase angle, δ, versus |$G^*$| gives the so-called van Gurp-Palmen (vGP) plot as can be seen in FIG. 1. See also M. van Gurp, and J. Palmen, J. Rheol. Bull., 67:5-8, 1998.

FIG. 1 shows the vGP-plot for the oil modified EDPM of example 1. The vGP-plot clearly shows a minimum in δ(|$G^*$|). The minimum, $δ_{min}$, is a complex quantity which comprises several polymer properties such as the molecular weight, the polydispersity, the long-chain branching see S.

Trinkle, and C. Friedrich, Rheol. Acta, 40:322-328, 2001, and the extender oil concentration.

Example 1

Preparation of an Oil Extended Polymer a):

A terpolymer of ethylene, propylene, and 5-ethylidene-2-norbornene (ENB) was produced using a catalyst system comprising vanadium trisacetylacetonate (V(acac)$_3$) as the catalyst, aluminumalkylhalide (diethylaluminum chloride (DEAC)) as the cocatalyst, and trichloro acetic acid ethyl ester (ETA) as the catalyst activator. The C2/C3 ratio of the copolymer and the diene content can be seen from table 1.

A continuous polymerization reaction was run in a reactor provided with agitation and fitted with an evaporative cooling device. The reactor was first charged with propylene, ENB, ethylene and butane, and the reactor contents were allowed to equilibrate at temperature of 12° C. The condensed volatiles from the evaporative cooling device were fed back to the reactor. Subsequent beds with 3A and 13X molecular sieves were used to clean and dry this stream and to remove especially oxygenated impurities that would diminish catalytic activity and polymer properties.

Continuous flows of gaseous ethylene, a 1 weight percent solution of DEAC in cyclohexane and a 0.2 weight percent solution of V(acac)$_3$ in toluene (containing in addition the activator at a molar ratio of 4:1 of activator to vanadium) were then fed to the reactor. Molar ratio of DEAC to V(acac)$_3$ was 22 to 1.

The pressure of the reactor contents was periodically adjusted to about 71 psig in order to maintain the temperature at 12° C. The onset of the reaction usually took 10-20 minutes from the start of the addition of catalyst and co-catalyst flows. Thereafter, the reactor was put into a continuous mode of operation with continuous flows of the monomers. The Mooney was controlled by adding about 100 ppm diethyl zinc.

The reactor feed recipe used was based on the molar ratio of the various components to 100 moles propylene and is set out in Table 1. The mean residence time of the reactants was 1 hour. The polymer slurry was collected in a vessel containing water. At the same time, a solution of Irganox 1076 in hexane and clear extender oil Conopure® 12P was continuously added to the vessel in an amount that the oil content of the final oil extended rubber was 50 phr and the Irganox 1076 content was 0.3 parts by weight per 100 parts by weight based on the ethylene-α-olefin-non-conjugated-diene copolymer (i).

The polymer slurry was subsequently stripped with steam in order to remove residual hydrocarbons and the polymer product was then dried. The polymer produced by the above process was analyzed for its composition and Mooney viscosity.

The Mw was 470 kg/mol, Mn was found to be 205 kg/mol. The polydispersity (PDI) was 2.3. The $\delta_{min}$ is 1.9. The Mooney viscosity ML(1+8) 150° C. is 67 MU. The polymer sample of exp 1 exhibit an intrinsic viscosity measured in Xylene at 70° C. of 4.4 (dl/g).

TABLE 1

| | $\delta_{min}$ [°] | Mw [kg/mol] | Mn [kg/mol] | PDI [—] | C2/C3 ratio [—] | ENB [wt %] | oil phr | IV [—]** |
|---|---|---|---|---|---|---|---|---|
| Exp. 1 | 1.90 | 470 | 205 | 2.3 | 1.9 | 5.5 | 50 | 4.8 |

**intrinsic viscosity measured in Decaline at 135° C.

Preparation of a Vulcanizable Rubber Composition

Ingredients:

Various vulcanizable rubber composition based on different oil extended EPDM compositions were prepared. The ingredients used for the various compound evaluations are listed in table 2.

TABLE 2

Summary of Ingredients

| Ingredient | Identity | Supplier |
|---|---|---|
| Vulkanox HS/LG | Antioxidant (2,2,4-trimethyl-1,2-dihydroquinoline, | Lanxess |
| Vulkanox ZMB2/C5 | Antioxidant (a mercapto-benzimidazole type) | Lanxess |
| Irganox ® 1076 | phenolic antioxidant | BASF |
| Corax ® N 774 | Carbon black | Orion Carbon |
| Corax ® N 550 | Carbon black | Orion Carbon |
| BR - Buna CB24 | Butadiene Rubber | Lanxess |
| S-SBR - Buna SL4525-0 | Styrene-butadiene Rubber | Lanxess |
| NR - SVR CV60 | Natural Rubber (cis-1,4-polyisoprene-)Polymer | |
| SUNPAR ® 2280 | paraffinic oil | Sunoco |
| EDENOR ® C 18 98-100 | stearic acid | Oleo Solutions Ltd |
| ZINKOXYD AKTIV | zinc oxide | Lanxess |
| RHENOGRAN ® S-80 | 80% sulfur | Rhein Chemie Rheinau |
| RHENOGRAN ® MBT-80 | 80% 2-mercaptobenzothiazole | Rhein Chemie Rheinau |
| Vulkacit ® Thiuram/C | Tetramethylthiuram disulfide | Lanxess |

All compounds were prepared on a laboratory internal mixer (GK1,5 E1 from Harburg-Freudenberger Maschinenbau GmbH; ram pressure 7 bar, 45 rpm, 70% degree of filling, mixing time 4 min); chemicals of the curing system were added on an open mill having 200 mm diameter of the rolls (20 rpm, 40° C. roll temperature, friction 1, 22).

Test specimen have been prepared for all compounds by curing test plates of 2 mm and 6 mm thickness at 180° C. to a time equivalent to t95 (t95 is the time to reach 95% of maximum torque during the MDR measurement)

Various processing, physical and dynamic mechanical properties were measured. The tested properties in the various trials were measured in accordance with the following test methods listed in Table 3.

TABLE 3

Test Methods.

| Name of method: | Standard: |
|---|---|
| Mooney Viscosity ML 1 + 4 at 100° C. S21 ML 1+ 4/100 [MU] Mooney Relaxation [%] MSR [MU/s] T5 (5% rise from min. viscosity) | ASTM D1646 |
| Mooney Viscosity ML 1 + 4 at 120° C. ML 1 + 4/125 [MU] Mooney Relaxation [%] MSR [MU/s] T5 (5% rise from min. viscosity) | ASTM D1646 |
| Mooney Viscosity ML 1 + 8 at 150° C. ML 1 + 4/125 [MU] Mooney Relaxation [%] MSR [MU/s] T5 (5% rise from min. viscosity) | ASTM D1646 |

TABLE 3-continued

Test Methods.

| Name of method: | Standard: |
|---|---|
| MDR 180° C. 20 min S16 | ASTM D5289 |
| ML (Minimum torque) | |
| MH (Maximum torque) | |
| Ts2 (Time to 1 dNm rise above ML) | |
| T90 (Time to 90% of maximum torque) | |
| Hardness [Shore A] | DIN 53505 |
| hot air 115° C., 0, 7 d | |
| hot air 125° C., 0, 42 d | |
| Tensile strength (before and after storage) | ASTM D412 |
| hot air 115° C., 0, 7 d | |
| hot air 125° C., 0, 42 d | |
| Rebound resilience (23° C. PV 110) | DIN 53512 |
| MTS | |
| A dynamic-mechanical analyser from MTS is used. The specimens are 6 mm in height and 20 mm in diameter. A double shear sandwich sample holder is applied where two samples are mounted symmetrically. The sample holder is placed in a furnace tempered to 23° C. for at least 30 min before the measurement is started. The linear viscoelastic properties of the rubber materials are measured in simple shear geometry for frequencies in the range from 0.1 to 200 Hz (logarithmic scaling with 8 data points per decade). A peak-to-peak amplitude of 0.3 mm is applied. | |

Dynamic Tear Analyzer

The crack propagation measurements were carried out with a Tear Analyzer from Coesfeld. The data were recorded at 70° Celsius using strip-shaped sample specimens of 15 millimeter width, 1.5 millimeter thickness, and a freely suspended length of 65 millimeter. The specimens were nicked with a sharp razor blade (1 millimeter notch length). For each test strip, the exact sample thickness was determined. The specimens were uniaxial stretched with a pulse repetition rate of 4 Hz. The pulses were modulated with a harmonic wave with 30 Hz frequency and 20% to 30% amplitude. The end of lifetime is reached when the crack length is 10 millimeter.

Compounding Results; Example 1:

Various experimental trials were done to compare the properties of the vulcanizates based on the vulcanizable rubber compositions as given in table 4 based on various oil extended EPDMs in particular in view of rubber compositions as based on Keltan DE304 and Vistalon 8800 as defined in WO03/020806.

TABLE 4

Rubber stiffness and reinforcement

| | phr | phr | phr | phr |
|---|---|---|---|---|
| Exp 1 | 150 | | | |
| Vistalon 8800 | | | 115 | |
| Keltan DE 304 | | 175 | | |
| Keltan 5469 Q | | | | 200 |
| ZnO aktiv | 5 | 5 | 5 | 5 |
| Stearic acid | 2 | 2 | 2 | 2 |
| Corax N774 | 60 | 60 | 50 | 120 |
| Sunpar 2280 | 15 | 5 | 30 | 5 |
| Rhenogran S-80 | 0.64 | 0.64 | 0.64 | 0.64 |
| Rhenogran TMTD-70 | 1.25 | 1.25 | 1.25 | 1.25 |
| Rhenogran MBT-80 | 0.42 | 0.42 | 0.42 | 0.42 |
| Total | 234.31 | 249.31 | 204.31 | 334.31 |
| Hardness [ShA] | 45 | 40 | 44 | 44 |
| Modulus @ 100% elongation [Mpa] | 1 | 0.8 | 0.9 | 1 |
| Tan Delta [degrees] | 0.077 | 0.084 | 0.134 | 0.110 |
| Rebound Resilience [%] | 78 | 75 | 59 | 57 |

Key performance criteria for rubber mounts is vibration isolation, i.e. the lowest possible loss angle Delta (or Tan Delta by the MTS measurement, see table above) at a defined strain and for a given range of frequencies. In other words, a tan delta value of zero refers to an "ideal" elastic material. Such a material exhibit high resilience values, ideally 100%.

An important design parameter is the stiffness (or "spring constant") of the rubber mount, In practical terms it is often referred to the hardness or modulus at low elongation (i.e. the tangent at zero strain in the stress/strain curve) of the rubber material. Dynamic performance comparisons should therefore ideally be done for the same stiffness, i.e. hardness level. In EPDM compounding, the required hardness level is achieved through the reinforcement mechanism of appropriate fillers, such as carbon black. However, it is well-known that a high level of carbon black leads to higher tan delta values with poorer vibration isolation performances.

In all cases, the relative dynamic performance of the oil extended EPDMs according to the present invention with a certain low $\delta_{min}$ value, an EPDM type for optimal vibration isolation performances can be obtained.

Compounding Example 2.

To further improve the fatigue performance, an R rubber is added as component b). In the below example 2, three different R rubbers are added:

a) NR-SVR CV 60. This is an example of a Natural Rubber belonging to the group of Technically Specified Rubber produced in Vietnam. The Mooney viscosity at 100° C. is 60+/−5 MU.

b) S-SBR-Buna SL 4515-0. This is an example of a styrene-butadiene copolymer containing 25% of styrene produced by a solution polymerization using an alkyl-lithium catalyst. The Mooney viscosity at 100° C. is 45 MU.

c) BR-Buna CB24. This is an example of a solution high-cis (>96%) polybutadiene polymer produced with neodymium catalyst. The Mooney viscosity at 100° C. is 44 MU.

In Table 5, the formulations with the addition of a R rubber, is compared to a reference formulation without the addition of a R rubber. It is clearly noticed that the addition of the R rubber has a surprisingly strong effect on the tear propagation as measured by the Tear Analyzer.

At the applied stress level, the number of cycles until failure, i.e. fatigue lifetime, is improved markedly, from 20.000 cycles up to 83.000 cycles.

TABLE 5

Example of EPDM formulations with the addition of R rubbers to improve fatigue life time (no. of cycles until failure)

| Ingredient | [unit] | 2) | 2a) | 2b) | 2c) |
|---|---|---|---|---|---|
| oil extended polymer of exp. 1 | [phr] | 150 | 145 | 145 | 145 |
| NR - SVR CV 60 | [phr] | | 5 | | |
| S-SBR - Buna SL 4525-0 | [phr] | | | 5 | |

TABLE 5-continued

Example of EPDM formulations with the addition of R rubbers to improve fatigue life time (no. of cycles until failure)

| Ingredient | [unit] | 2) | 2a) | 2b) | 2c) |
|---|---|---|---|---|---|
| BR - Buna CB 24 | [phr] |  |  |  | 5 |
| N550 - Corax N 550/30 | [phr] | 50 | 50 | 50 | 50 |
| Par. oil - Sunpar 2280 | [phr] | 5 | 5 | 5 | 5 |
| ZMBI - Vulkanox ZMB2/C5 | [phr] | 1 | 1 | 1 | 1 |
| TMQ - Vulkanox HS/LG | [phr] | 0.75 | 0.75 | 0.75 | 0.75 |
| ZnO - Zinkoxyd aktiv | [phr] | 5 | 5 | 5 | 5 |
| Stearic acid - EDENOR C 18 98-100 | [phr] | 1.5 | 1.5 | 1.5 | 1.5 |
| MBT - Rhenogran MBT-80 | [phr] | 0.42 | 0.42 | 0.42 | 0.42 |
| TMTD - Vulkacit Thiuram/C | [phr] | 0.88 | 0.88 | 0.88 | 0.88 |
| Sulfur - Rhenogran S-80 | [phr] | 0.64 | 0.64 | 0.64 | 0.64 |
| Total weight | [phr] | 215.19 | 215.19 | 215.19 | 215.19 |
| Hardness | [Shore A] | 48.5 | 46 | 47 | 46 |
| Elongation | [%] | 738 | 897 | 957 | 977 |
| Tensile Strength | [Mpa] | 27 | 23 | 22 | 21 |
| Tear Analyser at 0.5 MPa stress | [kcycles] | 20 | 49 | 71 | 83 |

The invention claimed is:

1. A vulcanizable rubber composition comprising:
a) an oil extended copolymer composition consisting of:
  i) 100 parts of at least one ethylene-α-olefin-non-conjugated-diene copolymer having:
    a weight average molecular weight (Mw) of at least 300,000 g/mol,
    an intrinsic viscosity higher than 4, measured in Xylene at 70° C., and
    a polydispersity (Mw/Mn) smaller than 3;
  ii) 30 to 70 parts by weight per 100 parts by weight of the ethylene-α-olefin-non-conjugated-diene copolymer (i) of an extender oil; and
  iii) up to 5 parts by weight per 100 parts by weight of the ethylene-α-olefin-non-conjugated-diene copolymer (i) of auxiliary agents,
  whereby the oil extended copolymer composition has a phase angle $\delta_{min}$ of lower than 2.5;
b) 1 to 15 parts by weight per 100 parts by weight based on the ethylene-α-olefin-non-conjugated-diene (i) of an unsaturated rubber designated as R rubbers according to DIN/ISO 1629;
c) 30 to 100 parts by weight per 100 parts by weight based on the ethylene-α-olefin-non-conjugated-diene (i) of a filler,
d) 0 to 30 parts by weight per 100 parts by weight based on the ethylene-α-olefin-non-conjugated-diene copolymer (i) of a process oil, provided that the total amount of extender oil from the composition a) and process oil d) does not exceed 80 parts by weight per 100 parts by weight based on the ethylene-α-olefin-non-conjugated-diene copolymer (i); and
e) a vulcanizing agent.

2. The vulcanizable rubber composition according to claim 1, wherein the ethylene-α-olefin-non-conjugated-diene (i) has a ratio of ethylene units to α-olefin units of 73/27 to 40/60.

3. The vulcanizable rubber composition according to claim 1, wherein the non-conjugated diene of the ethylene-α-olefin-non-conjugated-diene (i) is selected from the group consisting of 1,4-hexadiene, 1,6-octadiene, 2-methyl-1,5-hexadiene, 6-methyl-1,5-heptadiene and 7-methyl-1,6-octadiene; cyclic non-conjugated dienes such as cyclohexadiene, dicyclopentadiene, methyltetraindene, 5-vinylnorbomene, 5-ethylidene-2-norbomene and 6-chloromethyl-5-isopropenyl-2-norbornene; trienes such as 2,3-diisopropylidene-5-norbomene, 2-ethylidene-3-isopropylidene-5-norbomene, 2-propenyl-2,2-norboma-diene, 1,3,7-octatriene and 1,4,9-decatriene; 5-vinyl-2-norbomene; 5-(2-propenyl)-2-norbomene; 5-(3-butenyl)-2-norbornene; 5-(4-pentenyl)-2-norbomene; 5-(5-hexenyl)-2-norbornene; 5-(5-heptenyl)-2-norbomene; 5-(7-octenyl)-2-norbomene; 5-methylene-2-norbomene; 6,10-dimethyl-1,5,9-undecatriene; 5,9-dimethyl-1,4,8-decatriene; 4-ethylidene-8-methyl-1,7-nonadiene; 13-ethyl-9-methyl-1,9,12-pentadecatriene; 5,9,13-trimethyl-1,4,8,12-tetradecadiene; 8,14,16-trimethyl-1,7,14-hexadecatriene; and 4-ethylidene-12-methyl-1,11-pentadecadien.

4. The vulcanizable rubber composition according to claim 1, wherein the α-olefin of the ethylene-α-olefin-non-conjugated-diene (i) is selected from the group consisting of propylene, 1-butene, 1-pentene, 1-hexene, 4-methyl-1-pentene, 1-octene, and 1-decene.

5. The vulcanizable rubber composition according to claim 1, wherein the extender oil of the oil extended copolymer composition a) is selected from the group consisting of paraffin, naphthene and aromatic extender oils obtained by purifying high boiling fractions of petroleum.

6. The vulcanizable rubber composition according to claim 1 wherein the unsaturated rubber of the component b) is selected from the group consisting of natural rubber (NR), polyisoprene (IR), styrene/butadiene rubber (SBR), polybutadiene rubber (BR), styrene/isoprene rubber (SIBR), nitrile rubber (NBR), butyl rubber isobutene/isoprene rubber (IIR), hydrogenated nitrite rubber (HNBR), styrene/butadiene/acrylonitrile rubber (SNBR), polychloroprene (CR), carboxylated styrene/butadiene rubber (XSBR), carboxylated butadiene/acrylonitrile rubber (XNBR), epoxydized natural rubber (ENR), epoxydized styrene/butadiene rubber (ESBR) and mixtures of these.

7. The vulcanizable rubber composition according to claim 1 wherein the unsaturated rubber is at least one rubber selected from the group consisting of NR, BR, SBR and IR.

8. A vulcanized rubber article comprising the vulcanizable rubber composition according to claim 1.

9. The vulcanized rubber article according to claim 8, wherein the article is an engine mount.

10. A process for forming a vulcanized rubber article, the process comprising:
processing the vulcanizable rubber composition according to claim 1 to form a shaped, molded article; and
curing the vulcanizable rubber composition.

11. The process according to claim 10, wherein the process comprises:
(i) kneading the oil-extended copolymer composition a), the rubber b), the vulcanizing agent e), the filler c), the process oil d) with a conventional kneading machine selected from an open roll mill, an internal mixer, a kneader, and an extruder, to obtain a mixed product, and
(ii) vulcanizing (cross-linking) the resulting mixed product under heating.

12. The vulcanizable rubber composition according to claim 1, wherein:
the non-conjugated diene of the ethylene-α-olefin-non-conjugated-diene (i) is selected from the group consisting of 1,4-hexadiene, 1,6-octadiene, 2-methyl-1,5-hexadiene, 6-methyl-1,5-heptadiene, 7-methyl-1,6- octadiene; cyclic non-conjugated dienes; trienes; 5-vinyl-2-norbomene; 5-(2-propenyl)-2-norbomene; 5-(3-butenyl)-2-norbomene; 5-(4-pentenyl)-2-norbomene; 5-(5-hexenyl)-2-norbomene; 5-(5-heptenyl)-2-norbomene; 5-(7-octenyl)-2-norbomene; 5-methylene-2-norbomene; 6,10-dimethyl-1,5,9-undecatriene; 5,9-dimethyl-1,4,8-decatriene; 4-ethylidene-8-methyl-1,7-nonadiene; 13-ethyl-9-methyl-1,9,12-pentadecatriene; 5,9,13-trimethyl-1,4,8,12-tetradecadiene; 8,14,16-trimethyl-1,7,14-hexadecatriene; and 4-ethylidene-12-methyl-1,11-pentadecadiene;

the α-olefin of the ethylene-α-olefin-non-conjugated-diene (i) is selected from the group consisting of propylene, 1-butene, 1-pentene, 1-hexene, 4-methyl-1-pentene, 1-octene, and 1-decene; and the unsaturated rubber is selected from the group consisting of natural rubber (NR), polyisoprene (IR), styrene/butadiene rubber (SBR), polybutadiene rubber (BR), styrene/isoprene rubber (SIBR), nitrile rubber (NBR), butyl rubber isobutene/isoprene rubber (HR), hydrogenated nitrile rubber (HNBR), styrene/butadiene/acrylonitrile rubber (SNBR), polychloroprene (CR), carboxylated styrene/butadiene rubber (XSBR), carboxylated butadiene/acrylonitrile rubber (XNBR), epoxydized natural rubber (ENR), epoxydized styrene/butadiene rubber (ESBR), and mixtures thereof.

13. The vulcanizable rubber composition according to claim 1, wherein the ethylene-α-olefin-non-conjugated-diene copolymer has a polydispersity (Mw/Mn) smaller than 2.8.

14. The vulcanizable rubber composition according to claim 1, wherein the ethylene-α-olefin-non-conjugated-diene copolymer has:

an intrinsic viscosity higher than 4.2 measured in Xylene at 70° C.; and a polydispersity (Mw/Mn) smaller than 2.6.

15. The vulcanizable rubber composition according to claim 14, wherein:

the ethylene-α-olefin-non-conjugated-diene (i) has a ratio of ethylene units to α-olefin units of 73/27 to 40/60;

the non-conjugated diene of the ethylene-α-olefin-non-conjugated-diene (i) is 5-ethylidene-2-norbornene;

the α-olefin of the ethylene-α-olefin-non-conjugated-diene (i) propylene;

the filler comprises at least one of carbon black, silica, calcium carbonate, talc and clay, wherein inorganic fillers may be surface treated with silanes;

the extender oil of the oil extended copolymer composition a) is selected from the group consisting of paraffin, naphthene, and aromatic extender oils obtained by purifying high boiling fractions of petroleum;

the vulcanizable rubber composition contains 2 to 10 parts by weight per 100 parts by weight based on the ethylene-α-olefin-non-conjugated-diene (i) of the oil extended copolymer composition a) of the unsaturated rubber;

the unsaturated rubber is at least one selected from the group consisting NR, BR, SBR and IR; and the vulcanizing agent is selected from the group consisting of sulfur; sulfur chloride; sulfur dichloride; 4,4'-dithiodimorpholine; morpholine disulfide; alkylphenol disulfide; tetramethylthiuram disulfide; selenium dimethyldithiocarbamate; organic peroxides, 2,5-dimethyl-2,5-di(t-butylperoxy)hexane, 2,5-dimethyl-2,5-di(benzoylperoxy)-hexane, 2,5-dimethyl-2,5-(t-butylperoxy)hexyne-3, di-t-butylperoxide, di-butylperoxide-3,3,5-trimethylclohexane, and t-butylhydroperoxide.

\* \* \* \* \*